R. A. BROWN.
Tread-Mill.

No. 202,783.        Patented April 23, 1878.

WITNESSES        INVENTOR.
Robert A. Brown
Gilmore, Smith & Co.
ATTORNEYS.

N. PETERS, PHOTO-LITHOGRAPHER, WASHINGTON, D. C.

UNITED STATES PATENT OFFICE.

ROBERT ALLEN BROWN, OF BURKE CENTRE, NEW YORK.

IMPROVEMENT IN TREAD-MILLS.

Specification forming part of Letters Patent No. 202,783, dated April 23, 1878; application filed March 9, 1878.

*To all whom it may concern:*

Be it known that I, ROBERT A. BROWN, of Burke Centre, in the county of Franklin and State of New York, have invented a new and valuable Improvement in Tread-Mills; and I do hereby declare that the following is a full, clear, and exact description of the construction and operation of the same, reference being had to the annexed drawings, making a part of this specification, and to the letters and figures of reference marked thereon.

Figure 1:
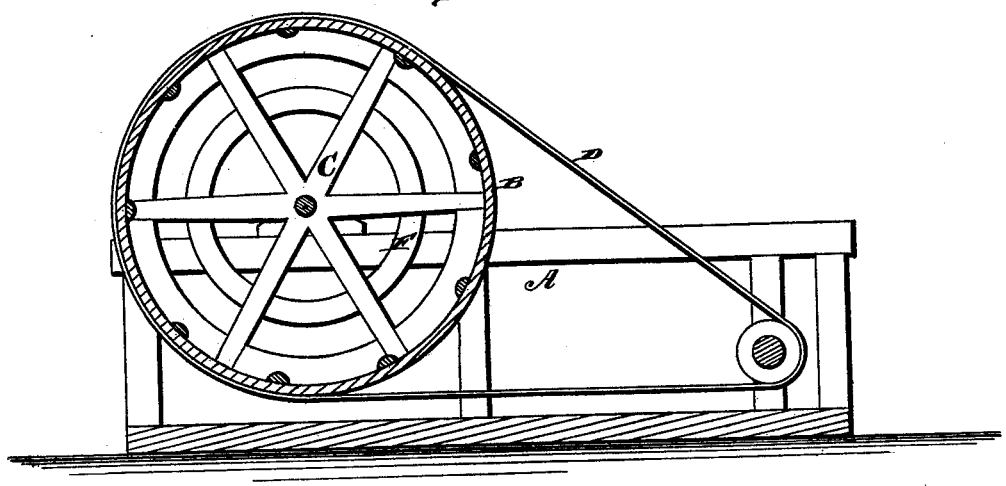
Figure 2:
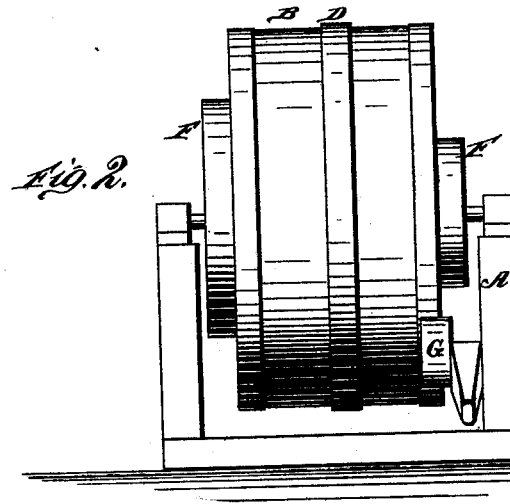

Figure 1 of the drawings is a longitudinal vertical sectional view of my tread-mill, and Fig. 2 is an end view thereof.

The nature of my invention consists in the construction and arrangement of a tread-mill or animal-power for operating a churn, washing-machine, or other small machinery, as will be hereinafter more fully set forth.

The annexed drawing, to which reference is made, fully illustrates my invention.

A represents a frame or two upright parallel standards, in which is journaled a hollow drum, B. This drum is entirely smooth on the inside, no slats or strips for the dog or other animal to step on or over, but a continuous unbroken surface for the dog to run on. The sides of the drum are formed by six-armed spiders, C, or any suitable number of arms, to which the shell of the drum is attached. The drum B itself forms a pulley, around which is passed a belt, D, for connection with the machinery to be driven. On the spiders C C are secured pulleys F F, of unequal size, as shown, around which to pass other belts. The same belt may be used for different purposes by changing from one pulley to another; or separate belts may be used around the different pulleys at the same time, to run two or more machines at one time. To the frame A is attached the brake G, which operates upon the outer surface of the cylinder B.

I am fully aware that a tread-mill in which animal-power is used, and having the drum itself forming a pulley, is not new, and I do not claim such, broadly, as my invention.

What I claim as new, and desire to secure by Letters Patent, is—

The cylindrical animal-power B, having an unbroken tread, and provided with drum-belts of different diameters, and brake G, operating upon the outer surface of the cylinder, substantially as described, and for the purpose set forth.

In testimony that I claim the above I have hereunto subscribed my name in the presence of two witnesses.

ROBERT ALLEN BROWN.

Witnesses:
GORDON H. MAIN,
JOHN DUFFERIN.